March 31, 1931. H. A. S. HOWARTH 1,798,204
AIR SEAL DEVICE
Filed Nov. 3, 1928  2 Sheets-Sheet 1
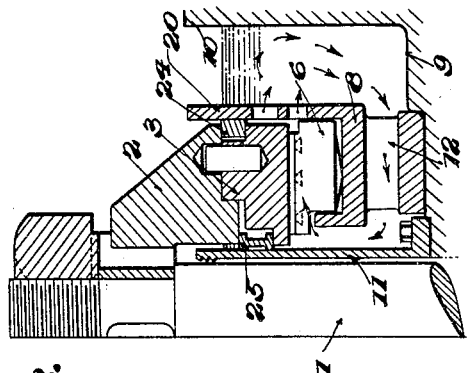

March 31, 1931.  H. A. S. HOWARTH  1,798,204
AIR SEAL DEVICE
Filed Nov. 3, 1928   2 Sheets-Sheet 2
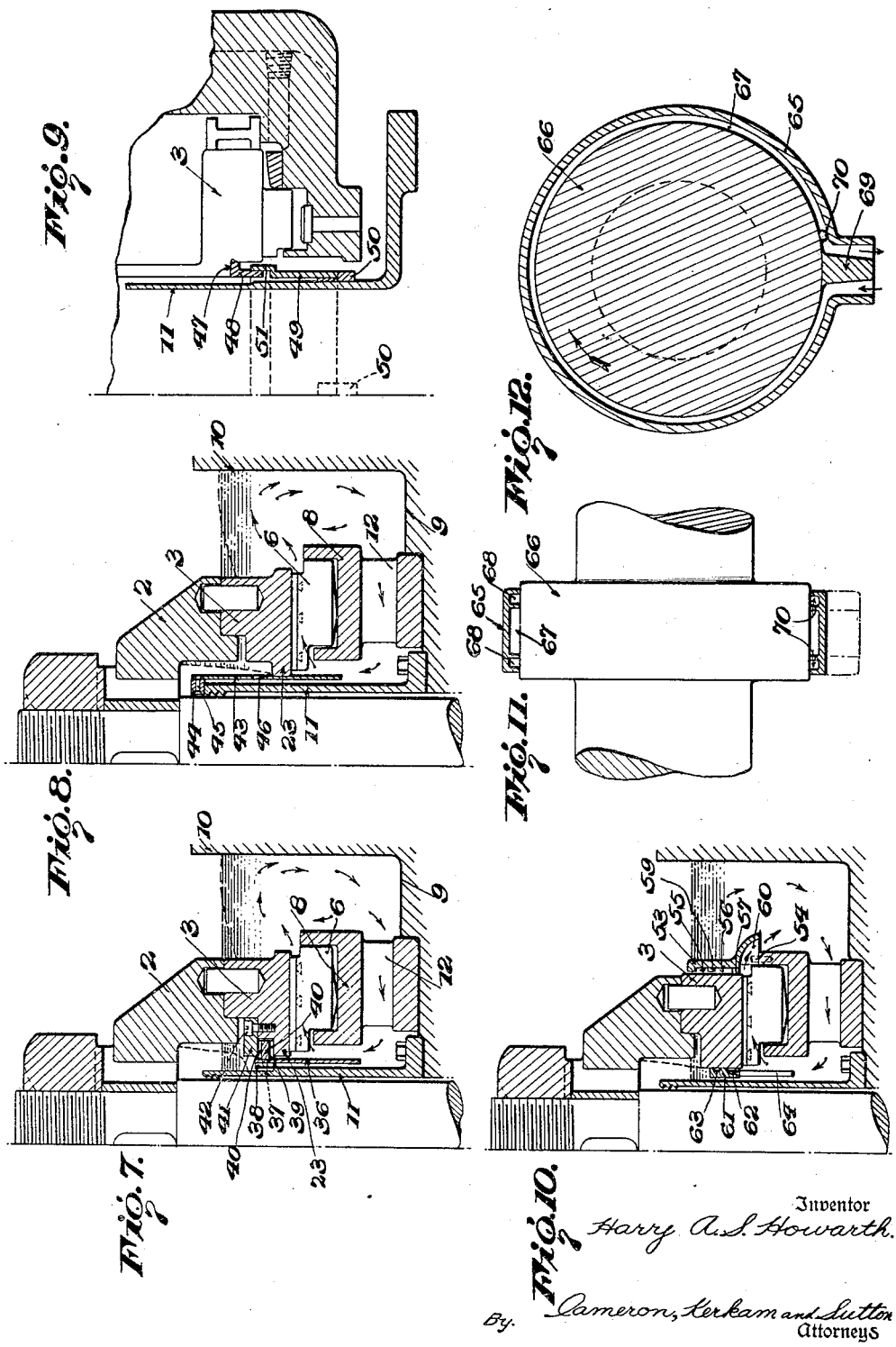

Patented Mar. 31, 1931

1,798,204

UNITED STATES PATENT OFFICE

HARRY A. S. HOWARTH, OF PHILADELPHIA, PENNSYLVANIA, ASSIGNOR TO KINGS-BURY MACHINE WORKS, INC., OF PHILADELPHIA, PENNSYLVANIA, A CORPORATION OF DELAWARE

AIR-SEAL DEVICE

Application filed November 3, 1928. Serial No. 317,001.

This invention relates to air seal devices for bearings, and more particularly to means for preventing a rotatable bearing member from churning air into the oil adjacent the periphery of said bearing member. In the patent to Kingsbury and Howarth, 1,501,404, of July 15, 1924, means are provided for the prevention of the churning of air into the oil at the outer periphery of a rotatable bearing member, comprising means for establishing an air seal of relatively air free oil surrounding the outer periphery of said member. It has been found in practice that while air seals of this character are effective to prevent mixture of air with the oil at the outer peripheries of high speed bearing members, still under some circumstances air may be drawn into the oil in other places such as at the radially inner periphery of the bearing members, and the efficiency of the lubrication impaired thereby.

It is an object of this invention therefore to provide a rotatable bearing member with novel means for preventing mixture of air with the oil which lubricates the bearing surfaces.

Another object is to provide a rotatable bearing member with novel means for maintaining an air seal between the atmosphere and the oil being fed to the bearing surfaces.

Another object of the invention is to provide a rotatable bearing member with means for maintaining an air seal of relatively air free oil adjacent the radially inner edge of the rotatable member.

Another object is to provide a rotatable bearing member with means cooperating therewith to form a restricted passage between the radially inner edge of the bearing member and the free surface of the lubricant.

Other objects and advantages will appear to those skilled in the art from the following description taken in connection with the accompanying drawings.

The invention is capable of receiving a variety of mechanical expressions, several of which are shown in the accompanying drawings, but it is to be expressly understood that the drawings are for purposes of illustration only, and are not to be construed as a definition of the limits of the invention, reference being had to the appended claims for that purpose.

Referring to the drawings, wherein the same reference characters are employed to designate corresponding parts in the figures:

Fig. 1 is a half-axial section of one type of bearing to which the present invention is applicable;

Fig. 2 is a half-axial section of such a bearing, showing one embodiment of the invention;

Fig. 3 is a half-axial section of a second embodiment of the invention;

Fig. 4 is a half-axial section of one form of the invention combined with the structure of the above cited patent;

Figs. 5, 6 and 7 are half-axial sections of other embodiments of the invention;

Fig. 8 is a half-axial section of another embodiment of the invention;

Fig. 9 is a half-axial section of another embodiment of the invention;

Fig. 10 is a half-axial section of another embodiment of the invention;

Fig. 11 is an elevation, partly in axial section, of the invention as applied to a horizontal shaft; and Fig. 12 is a vertical mid-sectional view of the structure shown in Fig. 11.

Referring first to Fig. 1 of the drawings, numeral 1 indicates a shaft provided in any suitable way with a thrust block 2 to which is connected in any suitable way a thrust collar 3 of any suitable construction and having a bearing surface 4. Cooperating with said bearing surface 4 is a stationary bearing member of any suitable construction, the same being shown as composed of a plurality of bearing segments or shoes 6 each being provided with a bearing surface 7. Said bearing shoes 6 may be mounted in any suitable way, but are preferably tiltably or flexibly mounted so that they may tilt both circumferentially to create and maintain wedge-shaped oil films, and radially so as to maintain substantially uniform bearing engagement in radial direction with the bearing surface of the thrust collar, all being in conformity with the principles of the Kingsbury thrust bearings as well known in the art. A base ring 8 is suitably mounted on the frame or foundation 9, and is adapted to support the shoes 6 of the stationary bearing in operative relationship with the rotary bearing member 3. The foundation or frame 9 is provided with an upstanding wall 10 encircling the bearing and cooperating with a cylindrical retaining member 11 which is suitably mounted at the center thereof, to form an oil well in which the thrust bearing is adapted to run submerged in oil. The base ring 8 is preferably provided with passages 12 to permit the oil to circulate from the body of the oil in the well into operative relation with the relatively rotatable bearing surfaces 4 and 7, as indicated by the arrows.

When the bearing is in operation oil is thrown off tangentially from the periphery of the rotating bearing member 3 and banks up against the outside wall of the pot, as indicated by the dotted line 14. The outward flow of the oil from the rotating bearing members is at the surface, and some of this oil returns to the region of the rotating bearing members within the main body of the oil in the well. In general this oil flows downward along the outer wall of the pot, and rises along the peripheries of the bearing members as indicated by the arrow 5, thus describing a generally annular path. Then joining the oil that is discharged from between the shoes, it rises along the periphery of the rotating bearing member and is thrown upward and outward again along the surface. It will thus be seen that air which is taken into the oil at the periphery of the runner, or which is contained in the oil which has passed between the bearing shoes, is thoroughly mixed with the oil in the reservoir.

At the bore or inner edge of the rotary bearing member or runner 3, the oil-retaining sleeve 11 forms a stationary surface along which the oil from the passages 12 rises on its way to feed the bearing surfaces 4 and 7. This oil is drawn outward at its free surface and acquires the speed of rotation of the rotary bearing member or runner 3, thereby filling the revolving bowl 15 formed by the innner surfaces of the runner 3 and thrust block 2, and presenting a parabolic surface as indicated at 16. When this bowl is full, any additional oil is discharged downward and mixes with the oil below the surface of the runner 3, that is rising to feed the bearing surfaces. This circulation of rapidly moving oil in contact with the air brings about a mixing of the air with the oil in the bore of the runner so that the oil which enters between the bearing surfaces is aerated, with a consequent reduction in the efficiency of the lubrication.

It has been found by experiment that if the depth of immersion of the runner is sufficient, the aeration remains near the free surface of the oil and does not extend to the bearing faces. The level of the oil at the bore of the bearing depends upon the level of the oil in the main portion of the pot, upon the rate of flow of the oil radially outward between the bearing shoes and bearing surfaces as affected by the resistance encountered in the path of flow, and upon any differences in pressure which may exist between the air in the bore of the bearing and the outside atmosphere. Sometimes bearings of this type are used in machines where there is a relatively lower pressure below the thrust bearing than in the air above it. This causes a flow downward of air between the shaft and the oil retainer 11. To control this variation in pressure, the oil retainer 11 may be fitted closely to the shaft 1 at its upper end, and may be made with an internally serrated surface at its upper end adjacent said shaft, and air vents such as indicated at 17 may be formed in the thrust member 2 of sufficient size to prevent the formation of an undue vacuum in the bore of the bearing members which might draw the oil over the top of the retainer member 11 and cause it to flow downward along the shaft.

One method of overcoming aeration of the oil is illustrated in Fig. 2 which shows a vertical thrust bearing substantially similar to that illustrated in Fig. 1, the similar parts being indicated by the same reference numerals. In this case the outside of the base ring 8 is provided with a cylindrical wall 20 which extends upwardly in close proximity to an annular rib 21 which projects laterally from the rotary bearing member or runner 3. The flange 20 is provided with suitable openings 22 located below the rib 21 of the runner 3 in order to allow circulation of the oil between the bearing shoes 6 and across the bearing surfaces 4 and 7. The radially inner surface of the runner 3 is also provided with an annular rib or ledge 23 which extends into close proximity with the oil retaining sleeve 11 and prevents the circulation of aerated oil from the chamber 15 downward to mix with the oil entering between the bearing surfaces. It will be seen that with this construction the oil may circulate through the bearing members without being thrown into contact with the air, and that the mixture of air with the oil is thus effectively reduced to a minimum.

Fig. 3 illustrates a modification of the structure shown in Fig. 2 in which the ribs 21 and 23 on the runner 3 of Fig. 2 are replaced by floating rings 24 and 25, respectively, which are loosely mounted in any suitable way between the thrust member 2 and the runner 3 so that they are free to move laterally with respect thereto. The floating rings 24 and 25 permit the use of small clearances without interfering with the freedom of the shaft to move slightly in lateral directions.

The rings effectively seal the rapidly moving oil from the atmosphere and thus prevent the aeration of the oil.

In the structure illustrated in Fig. 4, the runner 3 is provided with an outwardly extending annular flange 21 and an inwardly extending rib 23 substantially similar to the corresponding elements in Fig. 2. A channel-shaped ring member 26 is adjustably mounted upon the base ring 8 in the manner illustrated in the above cited patent to Kingsbury and Howarth, and forms an oil seal around the runner 3 in the manner set forth in said patent. The stationary base ring 8 is also provided with an inwardly extending shoulder 27, and a cylindrical floating baffle member 28 is adapted to rest upon the shoulder 27 and to extend upwardly beyond the rib 23 and in close proximity thereto. Vertical channels 29 are formed in the inner surface of the base ring 8 in order to allow free circulation of the lubricant from the passages 12 to the bearing surfaces, and the baffle member 28 has outwardly extending lugs 30 which are adapted to engage loosely in the channels 29 and prevent the rotation of the baffle member without preventing some radial movement of said member as permitted by the clearance between said member and the base ring 8. It will be seen that the oil can rise without interference in the space between the oil retaining member 11 and the baffle member 28 and feed over the top of the baffle member to the bore of the runner 3, but is prevented from coming down and mixing with the oil passing between the bearing members by reason of the small clearance allowed between the rib 23 on the runner and the baffle member 28.

Fig. 5 illustrates the use of a cylindrical baffle member such as 28 in Fig. 4, which is mounted in a somewhat different manner. In this case the base ring 8 is provided with dowels 31 extending inwardly from its inner surface, and a cylindrical baffle member 28, which is preferably formed from sheet metal, is notched at its lower end as shown at 32 in order to fit over the dowels 31. In this structure the bearing shoes 6 and runner 3 may be mounted in position, and thereafter the baffle member 28 may be lowered into place with the notches 32 engaging the dowels 31 without danger of jamming the parts or of injuring the bearing surfaces in such assembly. Otherwise the structure and manner of operation of the embodiment of Fig. 5 is or may be the same as that of Fig. 4 so far as the inner seal is concerned.

The structure illustrated in Fig. 6 is generally similar to the disclosure in Fig. 5 except that the upper end of the baffle member 28 has attached thereto in any suitable way an L-shaped ring 33 which is adapted to overlie the inwardly extending rib 23 on the runner 3. A ring 34, L-shaped in cross section, is attached to the runner 3, in any suitable way as by means of the screws 35, and is adapted to enclose the upper end of ring 33 with slight clearance between the adjacent surfaces. In this structure the oil flows upward between the oil retaining cylinder 11 and the sleeve 28, neither of which revolves, until it reaches the revolving L-shaped ring 34. The oil is thereupon caused to flow outwardly by centrifugal force, thus lubricating the bearing surfaces between the two adjacent rings. The rings 33 and 34 and rib 23 cooperate to form an air seal in and of themselves, and prevent leakage of aerated oil down to the bearing surfaces. The ring 33 is preferably made of bronze, while the L-shaped ring 34 fixed to the runner 3 may be made of steel, so that expansion of the two ring members caused by heating of the oil will tend to increase the clearance therebetween and prevent danger of seizure. The clearance between the ring 33 and the runner 3 is sufficient to prevent seizure on rise of temperature in the oil while there is sufficient clearance between member 28 and the surrounding parts so as not to interfere with the proper operation of the runner.

In the structure shown in Fig. 7, a sleeve 36 is fixed in spaced relation to the oil retaining cylinder 11 by any suitable means such as the rivets 37, the upper end of the sleeve 36 being provided with passages 38 between the sleeve and cylinder 11 in order to allow free passage of the oil into the space above the runner 3. A floating ring 39 is mounted to bear closely against the outer surface of the upper end of sleeve 36, and extends into a groove in the runner 3 formed by the projection 23 and a ring 41 fixed to the runner 3 in any suitable manner as by the screws 42. The ring 39 is provided with grooves 40 upon its upper and lower faces whereby U-shaped passages are formed which permit the oil to flow outward, downward, and then inward again when the bearing is in operation. In this manner an oil circulation is maintained somewhat similar to that described in Fig. 1 whereby the oil flows upwardly between the sleeve 36 and the cylinder 11 and then downward around the ring 39. However, any air which is entrained in the oil above the runner 3 will not follow the oil as it passes around the ring 39, by reason of the increased pressure which is encountered within the grooves 40.

In Fig. 8 a sleeve 43 is provided which surrounds the cylinder 11 in spaced relationship therewith, and which is provided with a ring 44 suitably attached to the upper end thereof as by means of rivets 45. The upper end of cylinder 11 is provided with lugs which cooperate with corresponding notches in the ring 44 to prevent rotation of the sleeve 43. The sleeve 43 is adapted to bear lightly within the rib 23 of runner 3, and is provided with suitable openings 46 to allow the oil to flow upward between the sleeve 43 and cylinder 11 and fill the space above the runner 3. Mixture of the aerated oil above the runner 3 with the oil flowing between the thrust bearing surfaces is prevented by the contact of sleeve 43 with the rib 23 on the runner 3.

In the structure shown in Fig. 9 the runner 3 is provided with an inwardly extending shoulder 47, and a ring 48, L-shaped in cross section, is fixed against said shoulder in any suitable way with a portion thereof extending downwardly in spaced relation to the runner 3. A sleeve 49 is adapted to surround the oil retainer 11, being spaced therefrom and having interlocking engagement with lugs 50 which are suitably fixed to the oil retainer 11. Sleeve 49 is provided with an upper offset portion 51 which has a light bearing contact on the outside of the L-shaped ring 48. It will be seen that the oil can rise freely between the lugs 50 and pass upwardly between the sleeve 49 and oil retainer 11, but is prevented from thereafter coming downward to mix with the oil passing through the thrust bearing surfaces, by reason of the bearing contact between the portion 51 of sleeve 49 and the ring 48. Ring 48 is preferably made of steel, while the sleeve 49 may be made of bronze in order that thermal expansion of these elements will slightly increase the clearance between these members and thus prevent any danger of their binding.

In the embodiment of the invention shown in Fig. 10 the runner 3 is provided with smooth cylindrical interior and exterior surfaces, and means are provided cooperating with either or both thereof to form oil seals therewith. The outer seal is formed by an annular member 53 which is mounted in any suitable way upon the base ring 8 and non-rotatably attached thereto as by means of the dowels 54. The annular member 53 is adapted to closely surround the runner 3 and is provided with a pair of circular grooves 55 and 56 upon its inner surface. The lower groove 56 is provided with an inlet 57 on its lower side, and a dam adjacent thereto which causes the groove to operate as a viscosity pump. An outlet 59 leading into the groove 55 is located on the opposite side of the dam so that rotation of the bearing causes the groove 55 to be filled with oil under pressure, thus forming an effective air seal. The annular member 53 is provided with suitable openings 60 which allow the circulation of the oil from the thrust bearing surfaces. As an oil seal for the inner periphery of the rotatable bearing member a second annulus 61 is fixedly mounted in any suitable way adjacent the inner surface thereof, and is formed to provide a viscosity pump 62 and an oil sealing groove 63 which is supplied with oil under pressure from said pump. A downwardly extending pipe 64 may be attached to the inlet of the viscosity pump 62 in any suitable way in order to insure a constant supply of oil to the viscosity pump irrespective of variations in the level of the oil in the pot. It will be noted that in this structure any leakage of oil between the annuli 53 and 61 and the surfaces of the runner 3 will be upward and outward, and surface oil is effectively prevented from entering the thrust bearings. The oil which flows upward and outward from the groove 55 of the annulus 53 flows, or is thrown, outward and takes up very little air, so that it does not cause aeration of the oil in the pot.

Figs. 11 and 12 illustrate an application of a viscosity pump and sealing grooves to a horizontal bearing. A stationary annulus 65 of any suitable construction is caused to closely encircle the rotating member 66 to be sealed. The annulus 65 is provided with a central viscosity pump groove 67 and two oil sealing grooves 68. The groove 67 is provided with a suitable dam 69 cooperating therewith to form the viscosity pump, and openings 70 are provided adjacent said dam to conduct the oil under pressure to the sealing grooves 68 and thus prevent entry of air into the viscosity pump and the consequent mixture of air with the oil discharged therefrom to lubricate the bearings.

While the embodiments of the invention illustrated in the drawings have been described with considerable particularity, it is to be expressly understood that the invention is not restricted thereto, as the same is capable of receiving a variety of other mechanical expressions some of which will now readily suggest themselves to those skilled in the art, while certain features thereof are capable of use without other features. Changes may also be made in the details of construction, arrangement and proportion of parts without departing from the spirit of this invention. While the invention has been shown as embodied in a bearing employing flexibly or tiltably mounted bearing segments, it is to be understood that the invention is not restricted thereto, as it is capable of application to bearings employing bearing members of other construction. Reference is therefore to be had to the claims hereto appended for a definition of the limits of the invention.

What is claimed is:

1. In a bearing in combination with rotatable and stationary bearing members and an oil well in which the bearing surfaces of said members are disposed, cooperating means carried by the rotatable bearing member and a stationary part for forming narrowly restricted oil passages between the free surface of the oil and the oil flowing to said bearing surfaces.

2. In a bearing in combination with rotatable and stationary bearing members and an oil well in which the bearing surfaces of said members are disposed, cooperating means carried by the rotatable bearing member and a stationary part beneath the level of the oil and disposed in close proximity so as to form narrowly restricted oil passages beneath the free surface of the oil and between the free surface of the oil and the oil flowing to said bearing surfaces.

3. In a bearing, in combination with rotatable and stationary bearing members, said bearing providing a circulation of oil between said bearing members, means between the circulating oil and the free surface of the oil for segregating a body oil to which the air has access from the circulating oil as it flows to the bearing surfaces.

4. In a bearing, in combination with rotatable and stationary bearing members, said bearing providing a circulation of oil between said bearing members, means between the circulating oil and the free surface of the oil for segregating a body of oil to which the air has access from the circulating oil as it flows to the bearing surfaces, said body having narrowly restricted communication with said circulating oil.

5. In a bearing, in combination with rotatable and stationary bearing members, said bearing providing a circulation of oil between said bearing members, cooperating elements on the rotatable and stationary parts of the bearing structure for segregating the oil set in motion adjacent the free surface of the oil at the bore of the rotatable bearing member from the oil flowing to the bearing surfaces.

6. In a bearing, in combination with rotatable and stationary bearing members, said bearing providing a circulation of oil between said bearing members, means providing a body of oil under pressure for sealing the circulating oil from the air as it flows to the bearing members.

7. In a bearing, in combination with rotatable and stationary bearing members and an oil well in which the bearing surfaces of said members are disposed, a stationary wall coaxial with the rotatable bearing member and forming an annular oil chamber therewith, and means to substantially prevent the passage of oil from said chamber to the bearing surfaces of the bearing members.

8. In a bearing, in combination with rotatable and stationary bearing members and an oil well in which the bearing surfaces of said members are disposed, a stationary wall coaxial with the rotatable bearing member and forming an annular oil chamber therewith, and an annular projection on the rotatable bearing member extending into close proximity to the wall and adapted to substantially prevent the passage of oil from said chamber to the bearing surfaces of the bearing members.

9. In a bearing, in combination with rotatable and stationary bearing members and an oil well in which the bearing surfaces of said members are disposed, a stationary cylindrical wall coaxial with the rotatable bearing member, and a floating ring carried by the rotatable bearing member and cooperating with the cylindrical wall to form an oil seal therewith.

10. In a bearing, in combination with rotatable and stationary bearing members and an oil well in which the bearing surfaces of said members are disposed, cooperating means carried by the rotatable bearing member and a stationary part and forming an air seal for the oil at the bore of the rotatable bearing member.

11. In a bearing, in combination with rotatable and stationary bearing members, an oil well in which the bearing surfaces of said members are disposed, a cylindrical wall coaxial with the rotatable bearing member, and means carried by the rotatable bearing member and cooperating with said coaxial wall to form an air seal therewith one of said cooperating parts being mounted to float.

12. In a bearing in combination with rotatable and stationary bearing members and an oil well in which the bearing surfaces of said members are disposed, a stationary wall arranged within the bore of the rotatable bearing member and coaxial therewith, and means cooperating therewith to substantially prevent surface oil from entering between the bearing surfaces.

13. In a bearing in combination with rotatable and stationary bearing members and an oil well in which the bearing surfaces of said members are disposed, a stationary wall arranged within the bore of the rotatable bearing member and coaxial therewith, and an annular projection on the rotatable bearing member extending into sufficiently close proximity with the stationary wall to substantially prevent flow of oil in which air is entrained to the oil flowing to the bearing surfaces.

14. In a bearing in combination with rotatable and stationary bearing members and an oil well in which the bearing surfaces of said members are disposed, a stationary wall arranged within the bore adjacent the circumference of the rotatable bearing member and coaxial therewith, and means on the rotatable bearing member cooperating with said wall to substantially prevent the passage of oil between the free surface of the oil and the bearing surfaces.

15. In a bearing in combination with rotatable and stationary bearing members and an oil well in which the bearing surfaces of said members are disposed, a stationary wall arranged within and adjacent the circumference of the rotatable bearing member and coaxial therewith, said rotatable bearing member and wall having annular projecting members extending into close proximity to form an air seal.

16. In a bearing in combination with rotatable and stationary bearing members and an oil well in which the bearing surfaces of said members are disposed, a fixed support for the stationary bearing member, a wall mounted on said support and extending adjacent the inner wall of the rotatable bearing member, and means on the rotatable bearing member cooperating with the wall to substantially prevent the passage of air to the oil flowing to the bearing surfaces.

17. In a bearing in combination with rotatable and stationary bearing members and an oil well in which the bearing surfaces of said members are disposed, a base ring for the stationary bearing member, a wall mounted thereon and extending within the bore of the rotatable bearing member, and means on the rotatable bearing member cooperating with said wall to form a narrowly restricted passage through which mixture of air with the oil flowing to the bearing surfaces is substantially prevented.

18. In a bearing in combination with rotatable and stationary bearing members and an oil well in which the bearing surfaces of said members are disposed, a fixed support for the stationary bearing member, a tubular wall splined to said support and extending adjacent the rotatable bearing member, and means on the rotatable bearing member cooperating with the wall to narrowly restrict the passage of oil therebetween.

19. In a bearing in combination with rotatable and stationary bearing members and an oil well in which the bearing surfaces of said members are disposed, a fixed support for the stationary bearing member, a tubular wall splined to said support and extending adjacent the rotatable bearing member, and an annular member on the rotatable bearing extending adjacent the tubular wall and cooperating therewith to narrowly restrict the passage of oil therebetween, the tubular wall having a higher thermal coefficient of expansion than the annular member.

20. In a bearing in combination with rotatable and stationary bearing members and an annular oil well in which the bearing surfaces of said members are disposed, a tubular wall fixed in spaced relation to the inner wall of the well within the bore of the rotatable bearing member, and means on the rotatable bearing member cooperating therewith to restrict the passage of oil between oil in contact with the air and oil flowing to the bearing surfaces.

21. In a bearing in combination with rotatable and stationary bearing members and an annular oil well in which the bearing surfaces of said members are disposed, a tubular wall fixed in spaced relation to the inner wall of the well within the bore of the rotatable bearing member, and an annular member on the rotatable bearing member extending adjacent the tubular wall and cooperating therewith to restrict the passage of oil between oil in contact with the air and oil flowing to the bearing surfaces.

22. In a bearing in combination with rotatable and stationary bearing members and an annular oil well in which the bearing surfaces of said members are disposed, a tubular wall fixed in spaced relation to the inner wall of the well within the bore of the rotatable bearing member, and an annular member on the rotatable bearing member extending adjacent the tubular wall and cooperating therewith to restrict the passage of oil between oil in contact with the air and oil flowing to the bearing surfaces, the tubular wall having a higher thermal coefficient of expansion than the annular member.

23. In a bearing in combination with rotatable and stationary bearing members and an annular oil well in which the bearing surfaces of said members are disposed, a tubular wall fixed in spaced relation to the inner wall of the well within the bore of the rotatable bearing member, and means on the rotatable bearing member cooperating therewith to restrict the passage of oil between oil in contact with the air and oil flowing to the bearing surfaces, said cylindrical wall providing passages for the oil to submerge the rotatable bearing member.

24. In combination, a rotatable bearing member, a grooved viscosity pump ring cooperating therewith to supply oil to the bearing surfaces, and oil seal for said pump ring preventing the admission of air into said pump.

25. In a bearing, in combination with rotatable and stationary bearing members, a stationary, grooved oil-sealing ring arranged adjacent the wall of the rotatable bearing member, and means for supplying oil under pressure to the sealing groove.

26. In a bearing, in combination with rotatable and stationary bearing members and an oil well in which the bearing surfaces of the bearing members are disposed, a viscosity pump at the bore of the rotatable bearing member and cooperating therewith to prevent the entraining of air in the oil entering between the bearing surfaces.

27. In a bearing, in combination with rotatable and stationary bearing members, a stationary, grooved oil-sealing ring arranged adjacent the wall of the rotatable bearing member, and a viscosity pump formed in said ring and cooperating with the rotatable bearing member to maintain the sealing groove full of oil under pressure.

28. In combination, a rotatable bearing member, a grooved viscosity pump ring cooperating therewith to supply oil to the bearing surfaces, said ring having grooves adapted to surround the rotatable bearing member on each side of the viscosity pump grooves and to be supplied with oil under pressure from said viscosity pump.

29. In a bearing, in combination with rotatable and stationary bearing members and an oil well in which the bearing surfaces of said members are disposed, cooperating members carried by the rotatable bearing member and the oil well and disposed at the bore thereof, said members providing restricted oil passages from which air will be excluded by pressure in the oil induced by the rotation of said rotatable member.

In testimony whereof I have signed this specification.

HARRY A. S. HOWARTH.